United States Patent [19]

Berger

[11] 4,007,814
[45] Feb. 15, 1977

[54] CARBON BRAKE DISK WITH CAST KEYSLOT REINFORCEMENT MEMBERS

[75] Inventor: Robert E. Berger, North Canton, Ohio

[73] Assignee: Goodyear Aerospace Corporation, Akron, Ohio

[22] Filed: Feb. 5, 1976

[21] Appl. No.: 655,582

[52] U.S. Cl. .................... 188/218 XL; 188/73.2; 192/70.19; 192/107 R
[51] Int. Cl.² .......................................... F16D 65/12
[58] Field of Search ...... 188/73.2, 218 XL, 251 M; 192/70.13, 70.19, 70.20, 107 R, 107 M; 164/25, 26

[56] References Cited
UNITED STATES PATENTS

| 2,553,828 | 5/1951 | McCune | 188/218 X L |
| 3,757,907 | 9/1973 | Crossman et al. | 188/218 X L |
| 3,904,000 | 9/1975 | Berger | 188/218 X L |
| 3,927,740 | 12/1975 | Zarembka | 188/218 X L |

OTHER PUBLICATIONS

*Metals Handbook*, 8th ed., Ohio, American Society for Metals, 1970, pp. 243, 253, 297.

*Primary Examiner*—George E. A. Halvusa
*Attorney, Agent, or Firm*—J. G. Pere; P. E. Milliken

[57] ABSTRACT

An annular carbon brake disk having cast metal keyslot reinforcement members which are shaped to intimately conform to the contour of the keyslots and to an adjacent surface area of the disk on each side of the keyslots. The reinforcement members are preferably investment castings of heat resistant stainless steel or other suitable metal and the walls of the reinforcement members are substantially thicker at the portion contacting the keyslot than at the other portions of the members. The keyslot reinforcement members may be used with either continuous or segmented disks.

12 Claims, 6 Drawing Figures

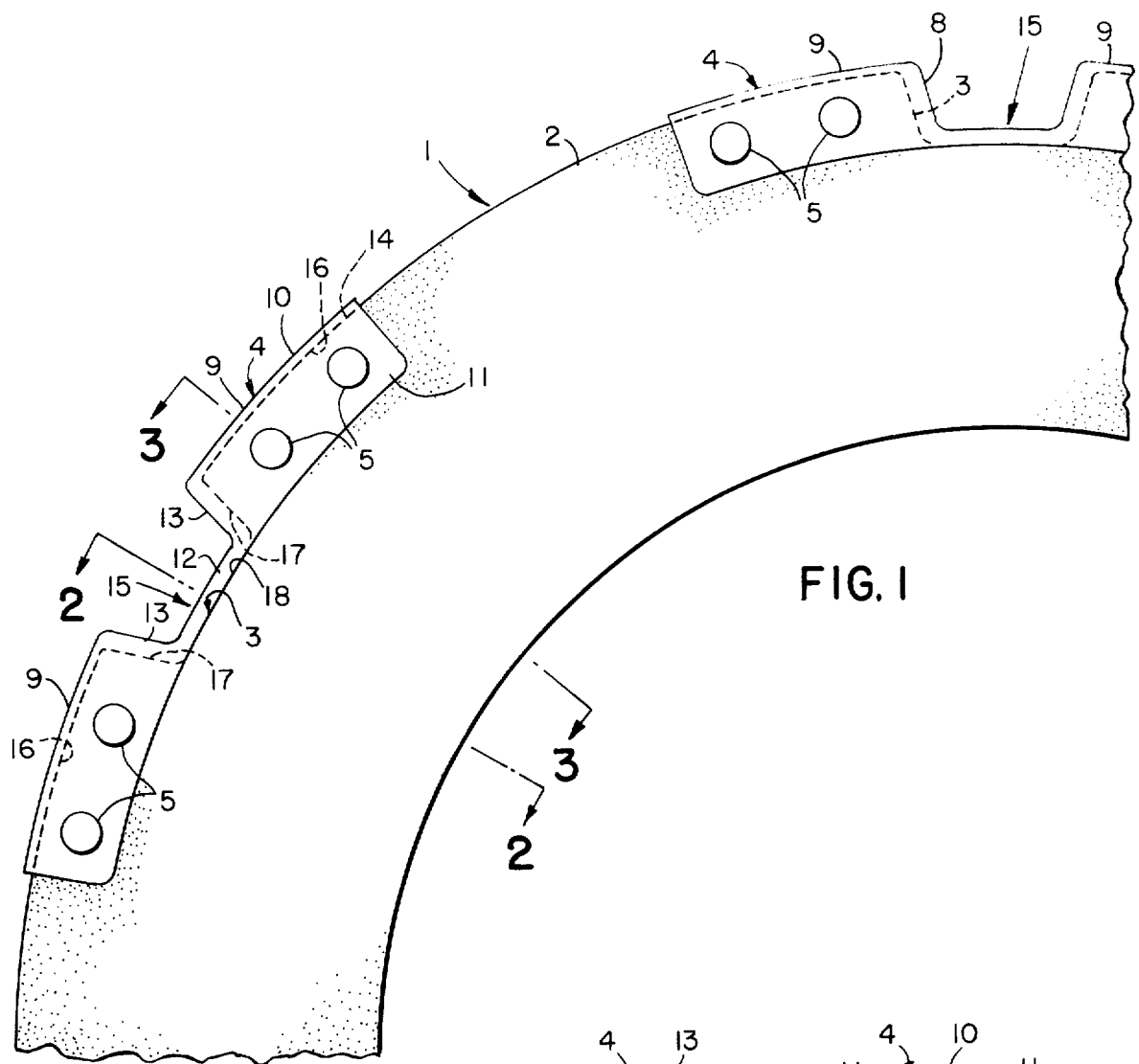
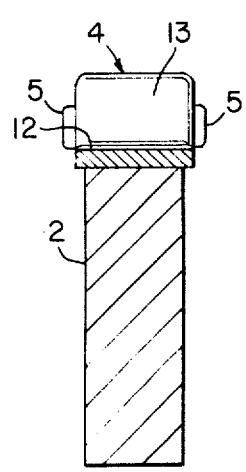
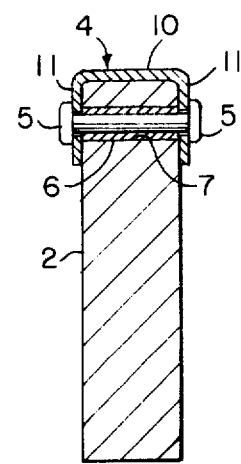

CARBON BRAKE DISK WITH CAST KEYSLOT REINFORCEMENT MEMBERS

BACKGROUND OF THE INVENTION

In recent years the use of carbon brake disks have increased and many types of keyslot reinforcements have been proposed to compensate for some of the limitations of physical properties of carbon disks and give increased wear in the keyslots of the disks. A typical keyslot reinforcement used in the past is made of stamped steel or other metal and is shown in such U.S. patents as U.S. Pat. No. 3,907,076 issued to R. L. Crossman et al.; U.S. Pat. No. 3,904,000 issued to R. E. Berger and U.S. Pat. No. 3,927,740 issued to R. L. Zarembka. The use of stamped steel keyway reinforcements resulted in improved disk life but is limited in that certain shapes cannot be formed by stamping and needed variations in wall thickness cannot be obtained by using a stamped part.

OBJECTS OF THE INVENTION

An object of this invention is to provide a carbon brake disk having a keyslot reinforcement which is easy to manufacture at lower cost and which has increased durability.

Another object of the invention is to provide a carbon brake disk keyslot reinforcement which has physical properties which are more compatible with the physical properties of the carbon disk with which it is used.

A further object of the invention is to provide a carbon brake disk keyslot reinforcement which is more versatile than previous devices and can be produced to accomodate various keyslot configurations and meet more demanding strength requirements. A still further object of the invention is to provide a keyliner which has full bearing against the keyway to reduce stresses in the assembly.

These and other objects of the invention will become more readily apparent in the following specification and the accompanying drawings.

SUMMARY OF THE INVENTION

A brake disk comprising an annular friction disk means of carbon based material having: a plurality of substantially U-shaped keyslots spaced around one periphery of the disk and extending transversely therethrough, a plurality of cast keyslot reinforcement members fixedly attached to the disk means at said keyslots each member having: a substantially U-shaped center portion substantially conforming to the contour of the keyslot and in intimate contact therewith, a pair of channel shaped end portions integrally formed with the center portion and receiving within the channel of each end portion, a portion of the sides and periphery of the disk means adjacent to each side of the keyslot, the walls of the end portions intimately contacting the disk means, at least part of the walls of the center portion being substantially thicker than the walls of the end portions, and means fixedly attaching the keyslots to the disk means.

BRIEF DESCRIPTION OF THE DRAWINGS

FIG. 1 is a fragmentary side elevational view of a brake disk having metal keyslot reinforcements assembled thereon;

FIG. 2 is a cross-sectional view taken on line 2—2 of FIG. 1;

FIG. 3 is a cross-sectional view taken on line 3—3 of FIG. 1;

DESCRIPTION OF THE PREFERRED EMBODIMENTS

Figure 4:
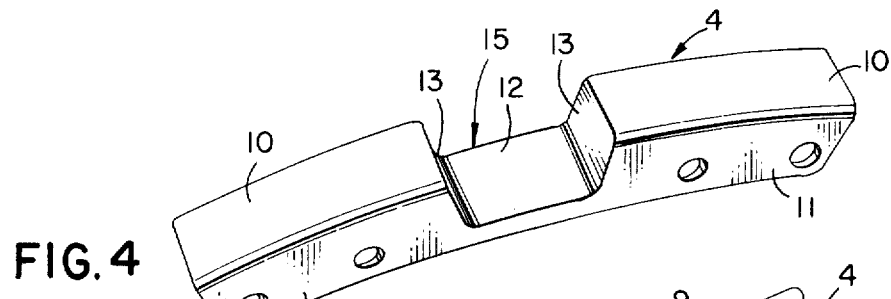
FIG. 4 is top perspective view of the keyslot reinforcement member similar to that used in the embodiment of FIG. 1.

Referring to FIGS. 1 through 3 the numeral 1 indicates generally a brake disk assembly having a continuous annular friction disk or ring 2 of carbon based material. The friction disk 2 is provided at uniformly spaced intervals on its outer circumference with keyslots 3. Metal keyslot reinforcement members 4 are secured to the annular disk 2 at each of the slots 3 and held in place by rivets 5 passing through bushings 6 in holes 7 in the disk 2.

The annular friction disk 2 is preferably made from a carbon base material. The carbon base may be carbon itself, particularly in the form of graphite or amorphous carbon, or carbon compounds typical of which are the carbides such as boron carbide, silicon carbide and titanium carbide. Mixtures of carbon in its various forms may of course be used. In addition to the carbon base, other ingredients may be used such as anti-oxidants, binders, fillers, strengthening agents and reinforcing fibers or cloth laminates. However, it should be understood that the principles of the invention are applicable to any brake material, or brake disk, and are not limited to this type of carbon base material.

The keyslot reinforcement members 4 are castings made preferably by the investment casting process. Stainless steel is one preferred material which may be used although a wide range of metal alloys may be used provided they give the desired physical properties. The use of investment cast reinforcement members makes it possible to form a close tolerance part with a homogeneous metal structure that is not present in the conventional stamped keyslot reinforcement clips which have been previously used. Furthermore, the cast member permits a wider choice of metal alloys with material properties more compatible with the carbon disks. Making the reinforcement members 4 by a casting process makes it possible to have variation in the wall thickness so that in parts of the reinforcement member where greater strength is needed the wall may be made thicker and where less strength is needed the wall may be made thinner thus providing the optimum strength where needed while maintaining a minimum total weight in each reinforcing member.

Describing the members 4 in greater detail as shown in FIGS. 1 through 5, they are comprised of a substantially U-shaped center portion 8 and pair of substantially identical channel shaped end portions 9 one of which is integrally formed on each side of the center portion. Each of the end portions has a top wall 10 and a pair of side walls 11 extending downwardly from opposite edges of the top wall. The center portion has a bottom wall 12 and a pair of side walls 13 extending upwardly from each side of the bottom wall 12.

Figure 5:
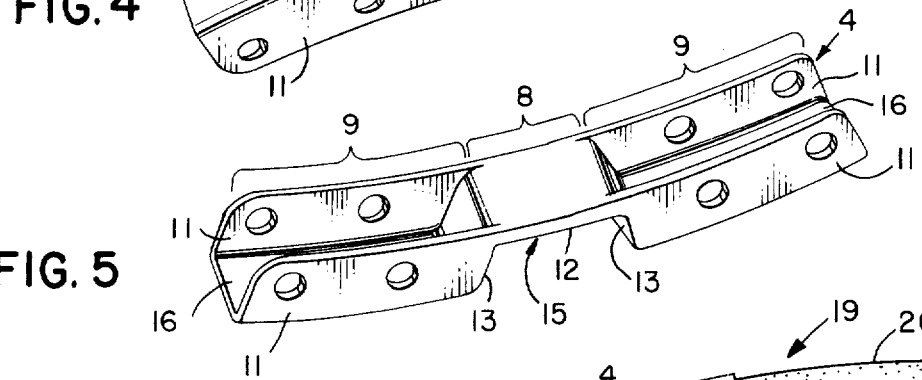
FIG. 5 is a bottom perspective view of the keyslot reinforcement member shown in FIG. 4.

As shown in FIGS. 4 and 5 the keyway reinforcement member 4 is cast as a single integral piece with the center portion 8 and the two end portions 9 forming an elongated member curved to fit the periphery 14 of the disk 2, and the center portion shaped to fit the keyslot 3 and forming a substantially U-shaped slot 15 extending transversely across the member 4. The end pieces form substantially longitudinal slots 16 which fit over a portion of the periphery 14 of this disk 2 on each side of the keyslot 3.

The wall thickness of the center portion is preferably about twice that of the wall thickness of the end portions 9. The thick bottom wall 12 provides better stress distribution between the end portions 9 and in turn more uniform loading on the rivets 5. The thick side walls 13 completely cover and bear against the entire side edges 17 and thereby provide greater protection for the side edges 17. The thick bottom wall 12 completely covers and bears against the entire bottom edge 18 of the keyslot.

While the side walls 11 are shown as inclined at an oblique angle to the bottom wall 12, they may also be perpendicular. While various angles may be used, it is preferred that each of the side walls be inclined at approximately 10° to 30° from the perpendicular to the bottom wall 12 so that they define an angle which diverges toward the outer periphery of the disk. If the disk has keyslots on the inner periphery of the disk, then the side walls of the keyslot will diverge toward the inner periphery of the disk.

The reinforcing member 4 completely covers the side edges 17 and the bottom edge 18 of the keyslot 3 and a portion of the periphery 14 on each side of the keyslot and is in intimate contact with the surface of all portions of the disk covered, thereby limiting oxidation of the carbon material in the area covered.

Figure 6:
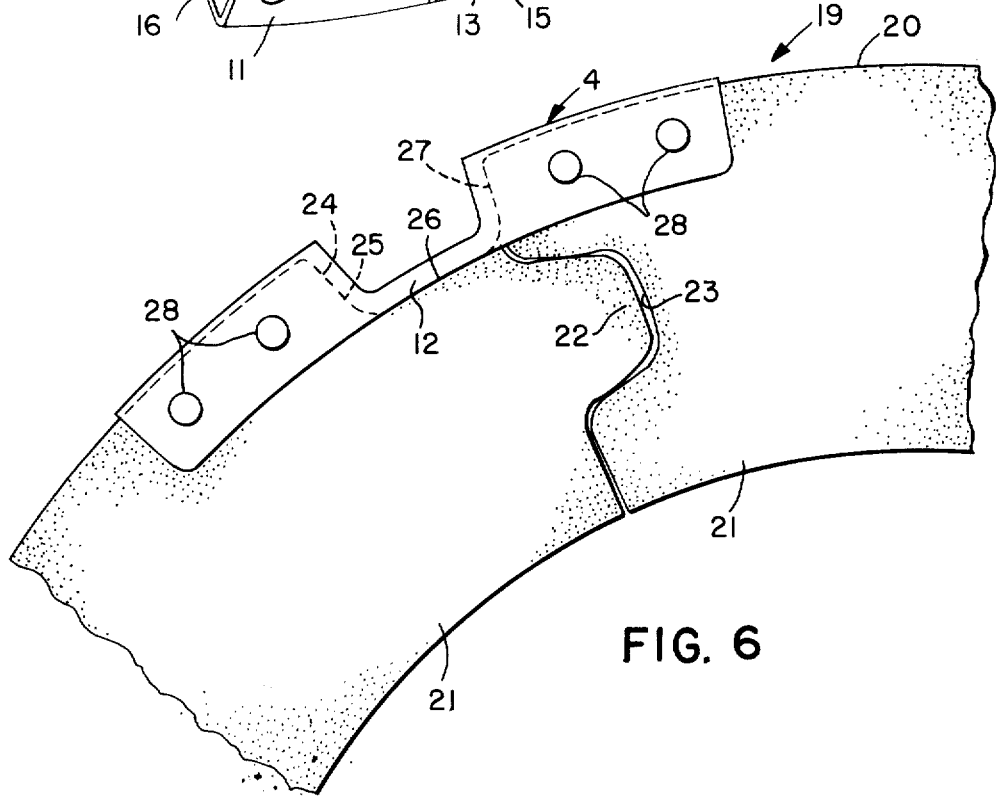
FIG. 6 is a fragmentary side elevational view of a segmented brake disk with a metal keyslot reinforcement assembled thereon.

FIG. 6 illustrates how the same keyway reinforcement members 4 that are used on the continuous carbon disk 2 may also be used on a segmented disk assembly 19 comprising an annular disk 20 having segments 21. The segments have interfitting tongues 22 and grooves 23 similar to those shown in U.S. Pat. No. 3,904,000. The particular configuration of the segments does not form a part of the invention but is used merely for the purpose of illustration of the use of the keyway reinforcement member 4 with a segmented disk. The keyslots 24 are formed at the juncture of the segments 21 with one sidewall 25 and a bottom wall 26 being formed by one segment and the opposite sidewall 27 of the keyslot 24 being formed by the next adjacent segment 21.

The reinforcement member 4 fits over the keyslot 24 in the same manner as it fits keyslots 3 in FIG. 1 as previously described and is fastened in place by rivets 28. When used with the segmented disk the extra thickness of the bottom wall 12 of the center portion 8 is particularly advantageous in withstanding the stresses on the member 4 at the locations where the segments are joined together.

Other modifications may be made in the embodiments shown herein without departing from the scope of the invention.

What is claimed is:
1. A brake disk comprising:
   A. an annular friction disk means of carbon based material having;
      1. a plurality of substantially U-shaped keyslots spaced around one periphery of the disk and extending transversely therethrough;
   B. a plurality of cast keyslot reinforcement members fixedly attached to the disk means at said keyslots each member having;
      1. a substantially U-shaped center portion substantially conforming to the contour of the keyslot and in intimate contact therewith;
      2. a pair of channel shaped end portions integrally formed with the center portion and receiving within the channel of each end portion, a portion of the sides and periphery of the disk means adjacent to each side of the keyslot, the walls of the end portions intimately contacting the disk means;
      3. at least part of the walls of the center portion being substantially thicker than the walls of the end portions;
   C. means fixedly attaching the keyslots to the disk means.

2. A brake disk as claimed in claim 1 wherein the keyslot reinforcement members are investment castings.

3. A brake disk as claimed in claim 2 wherein the keyslot reinforcement members are cast from stainless steel.

4. A brake disk as claimed in claim 1 wherein all the walls of the center portion of the keyslot reinforcement member are substantially thicker than the walls of the end portions.

5. A brake disk as claimed in claim 1 wherein the annular friction disk means is a segmented disk and the keyway reinforcements serve as connecting links to fasten the segments together.

6. A brake disk as claimed in claim 1 wherein the bottom wall of the center portion of the keyway reinforcement members is thicker than the walls of the end portions thereof.

7. A brake disk as claimed in claim 1 wherein the side walls of the U-shaped center portion are inclined at an angle diverging toward the periphery of the disk means in which the keyslots are located.

8. A brake disk comprising:
   A. an annular friction disc means of carbon based material having;
      1. a plurality of evenly spaced keyslots formed around one periphery of the disk means;
      2. each of the slots having a bottom edge extending in a substantially circumferential direction and two opposed side edges extending from the bottom edge toward the periphery of the disk means, the edges defining a substantially U-shaped slot extending transversely through the disk means;
   B. a plurality of cast keyslot reinforcement members fixedly secured to the disk means at said keyslots each reinforcement member comprising;
      1. a pair of substantially identical end portions of substantially U-shaped cross-section defining longitudinally extending channels in the member;
      2. a center portion integrally formed between the end portions, said center portion having a bottom wall and two side walls extending upwardly from the ends of the bottom wall, the center portion defining a substantially U-shaped channel extending transversely of the reinforcing member facing in the opposite direction to the channels in the end portions;

3. at least the bottom wall of the center portion being substantially thicker than the walls of the end portions;
4. the walls of the center portion being in intimate face to face contact with adjacent edges of the keyslot when the reinforcing member is assembled on the disk means;
5. the end portions of the member covering a portion of the sides and periphery of the disk means adjacent each side of each keyslot; and C. means fixedly securing the reinforcement members on the disk means.

9. A brake disk as claimed in claim 8 wherein the keyslot reinforcement members are investment castings.

10. A brake disk as claimed in claim 8 wherein the keyslot reinforcement members are cast from stainless steel.

11. A brake disk as claimed in claim 8 wherein all the walls of the center portion of the keyslot reinforcement member are substantially thicker than the walls of the end portions.

12. A brake disk as claimed in claim 8 wherein the annular friction disk means is a segmented disk and the keyway reinforcements serve as connecting links to fasten the segments together.

* * * * *